United States Patent [19]
Williams

[11] 3,751,072
[45] Aug. 7, 1973

[54] SWINGING TYPE TRAILER HITCH

[76] Inventor: Galen Williams, 2508 Random Acres Ct., Pittsburg, Kans. 66762

[22] Filed: Aug. 25, 1971

[21] Appl. No.: 174,817

[52] U.S. Cl. ............................................ 280/491 B
[51] Int. Cl. ............................................... B60d 1/06
[58] Field of Search ..................... 280/491 R, 491 B

[56] References Cited
UNITED STATES PATENTS

| | | | |
|---|---|---|---|
| 2,849,243 | 8/1958 | Halverson | 280/491 B |
| 3,117,805 | 1/1964 | Schoeffler | 280/491 B |
| 2,958,543 | 11/1960 | Cooper et al. | 280/491 B |
| 3,281,162 | 10/1966 | Carson | 280/491 B X |
| 3,410,579 | 11/1968 | Jenson | 280/491 B |
| 2,576,383 | 11/1951 | Avery | 280/491 B |

Primary Examiner—Leo Friaglia
Attorney—Edmund C. Rogers et al.

[57] ABSTRACT

This invention relates to a retractable trailer hitch and more particularly to one having quick release and locking means for placing the hitch in either its tow or store position and includes a housing, a retractable T-bar mounted within the housing, and a pivotal tow plate pivotally mounted near the center of the housing for swinging movement between a tow position and a stored position. The T-handle is spring biased to releasably lock the tow plate in either of its two positions.

17 Claims, 10 Drawing Figures

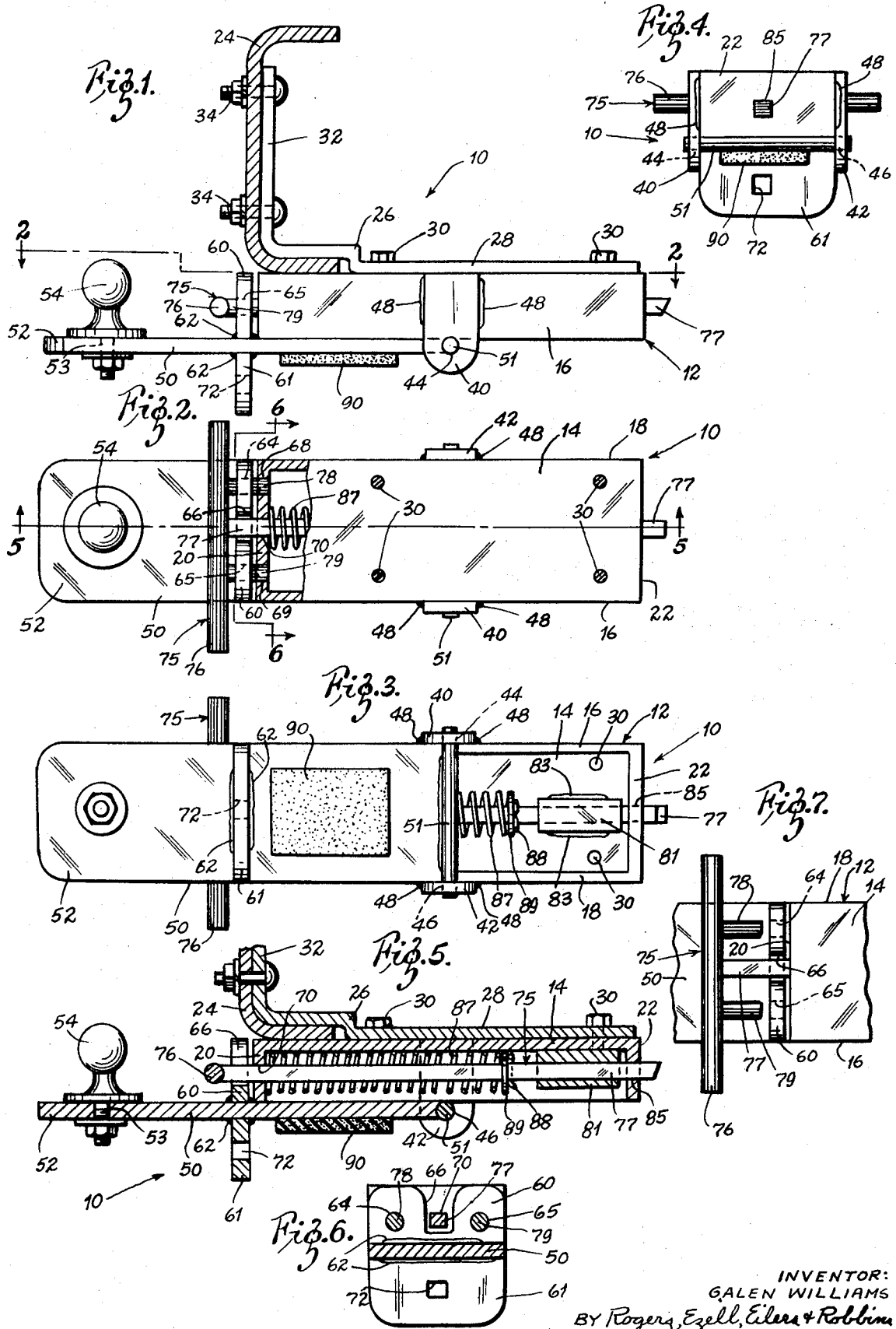

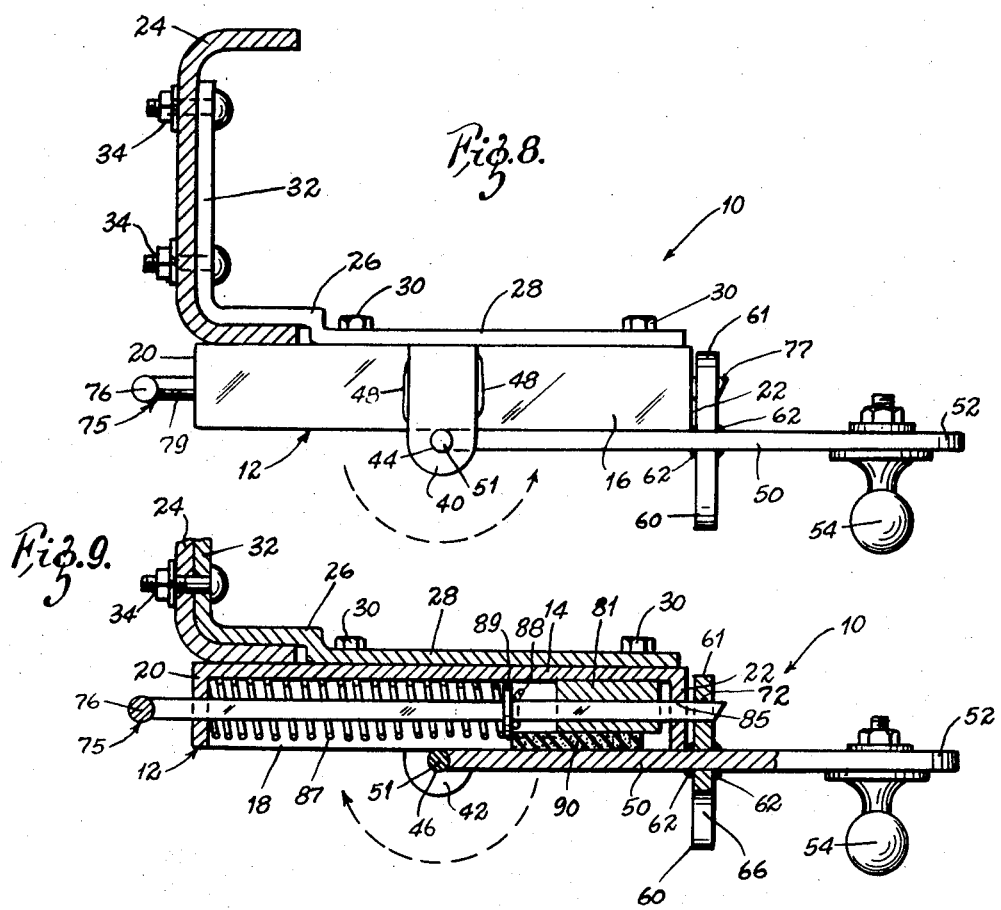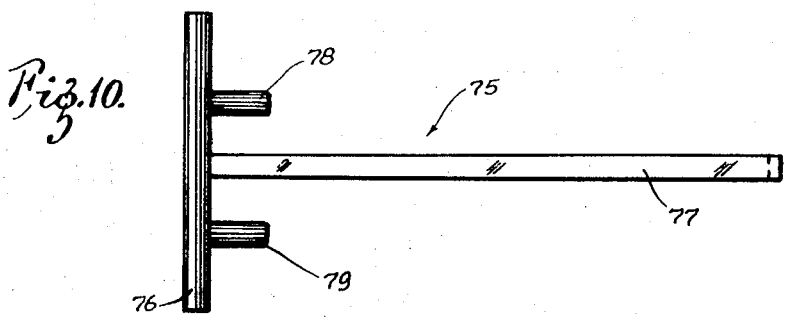

SWINGING TYPE TRAILER HITCH

SUMMARY OF THE INVENTION

This invention provides a novel means for releasably locking a retractable trailer hitch in either a tow or store position. The trailer hitch of this invention includes a housing having a tow plate pivotally mounted approximately midway between the ends of the housing. The tow plate has upper and lower vertically extending plates which are located just outside the end of the housing. A T-handle is spring biased within the housing and includes a shaft extending through the ends of the housing. The T-handle also has studs which extend through holes in the upper extending vertical plate and one end of the housing to lock the tow plate in its tow position.

The lower vertically extending plate has an aperture through which the shaft of the T-handle extends when the tow plate is swung to its store position, thereby locking the tow plate in that position. One end of the tow plate extends out beyond the vehicle when in the tow position and includes means for mounting a suitable tow ball. The tow plate is held locked in either its tow or store position by action of the spring bias.

By simply pulling the T-handle against its spring bias the tow bar is released so that it can be swung to either of tis two positions. Means are also provided for mounting the hitch assembly to the frame or bumper of a vehicle.

DESCRIPTION OF THE DRAWINGS

FIG. 1 is a side elevational view of the trailer hitch of this invention shown in its tow position;

FIG. 2 is a view in section taken along the line 2—2 of FIG. 1;

FIG. 3 is a bottom view of the trailer hitch of FIG. 1.

FIG. 4 is a right end elevational view of the trailer hitch of FIG. 1 without the mounting bracket;

FIG. 5 is a view in section taken along the line 5—5 of FIG. 2;

FIG. 6 is a view in section taken along the line 6—6 of FIG. 2;

FIG. 7 is a fragmentary view of FIG. 2 showing the T-bar of this invention in its retracted position;

FIG. 8 is a side elevational view showing the trailer hitch of this invention shown in its store position;

FIG. 9 is a sectional view similar to FIG. 5 but showing the trailer hitch in its store rather than tow position; and FIG. 10 is a plan view of the T-bar of this invention.

DETAILED DESCRIPTION OF A PREFERRED EMBODIMENT

Referring generally to FIGS. 1–7 of the drawing, there is shown the retractable trailer hitch 10 of this invention including a housing 12 having a top plate 14, side plates 16 and 18, and end plates 20 and 22. The hitch is mounted to a bumper or frame 24 of a vehicle (not shown) by means of a bracket 26 having a horizontal portion 28 secured to the top plate 14 of the hitch by any suitable means such as nut-and-bolt assemblies 30, and a vertical portion 32 secured to the bumper of frame member 24 also by any suitable means such as nut-and-bolt assemblies 34.

Mounted about halfway between the ends of side plates 16 and 18, such as by welds 48, are vertical arm members 40 and 42, each having a portion that extends below the lower edge of the side plates. These lower portions have holes 44 and 46 respectively directly adjacent the lower edge of the plates 16 and 18. The holes 44 and 46 are in axial alignment.

A horizontal tow plate 50 has a pin 51 mounted along one of its ends such as by welding, the pin 51 having end portions which extend beyond the side edges of the plate 50 into the holes 44 and 46. In this way the plate 50 is allowed to pivot within the holes 44 and 46. The plate 50 has an end portion 52 which extends out beyond the end of the vehicle with a hole 53 therein for mounting a suitable tow ball 54.

An upwardly extending vertical plate 60 and a lower extending vertical plate 61 are mounted, such as by welds 62, to the tow plate 50 just outside the end plate 20 of the housing 12. The upper plate 60 has holes 64 and 65 with a U-shaped groove 66 therebetween. The holes 64 and 65 are aligned with a pair of holes 68 and 69, respectively, in the end plate 20 of the housing 12, and the U-shaped groove 66 is aligned with an aperture 70 in the end plate 20. Located approximately in the center of the lower vertical plate 61 is an aperture 72.

A T-handle 75 (FIG. 10) provides a releasable locking means for placing the trailer hitch in either its tow or store position. The T-handle includes a handle member 76 having extending perpendicularly therefrom a shaft 77. On either side of the shaft 77, and parallel to it, are stud members 78 and 79. A tubular guide member 81 is mounted inside the housing 12 to the upper plate 14 such as by welds 83. The end plate 22 of the housing 12 has an aperture 85 axially aligned with the tubular member 81 and the aperture 70 in the end plate 20. The T-handle 75 is mounted with its shaft 77 extending through the aperture 70, guide member 81, and aperture 85. The studs 78 and 79 are aligned such that with the shaft 77 so mounted they extend through the holes 64 and 68, and 65 and 69, respectively. A spring 87 is mounted around the shaft 77 between the end wall 20 and a retaining pin 88 and washer 89 to spring bias the T-handle 75 so as to hold the studs 78 and 79 in the holes 64 and 68 and 65 and 69. In this manner the plate 50 is held locked in the tow position shown in FIGS. 1 through 6.

To place the trailer hitch in its store position, the T-handle 75 is pulled against the bias of the spring 87 such that the studs 78 and 79 are completely withdrawn from the holes 64 and 68 and 65 and 69 of the plates 60 and 20. This releases the tow plate 50 so that it can be rotated about the pin 51 to a position shown in FIGS. 8 and 9. The aperture 72 in the plate 61 is located such that with the plate 50 in its store position, the aperture 72 is aligned with the aperture 85 in the end plate 22. With the plate 50 in its store position, the T-handle 75 is released allowing the shaft 77, under the force of the spring 87, to extend through the apertures 85 and 72, thereby locking the trailer hitch in its store position.

A rubber pad 90 is mounted to the upper surface of the plate 50 as viewed from its store position to dampen vibration caused by the plate 50 contacting the housing 12.

Therefore, the trailer hitch of this invention provides a novel means for quickly releasing and locking the hitch in either its tow or store position.

Various changes and modifications may be made within this invention, as will be readily apparent to those skilled in the art. Such changes and modifications are within the scope and teaching of this invention as defined by the claims appended hereto.

What is claimed is:

1. A retractable trailer hitch for a vehicle comprising a housing, a swinging member having one end pivotally mounted to the housing for swinging movement between tow and store position, its other end having means for supporting a tow ball in an upright position with the swinging member in the tow position, a releasable locking means mounted to the housing, first and second plates mounted to and extending in opposite directions from the swinging member, at least the first plate being mounted to the swinging member a finite distance from the pivot, means associated with the releasable locking means for engaging the first plate when the swinging member is in the tow position to releasably lock the swinging member in said tow position, means associated with the releasable locking means for engaging the second plate when the swinging member is in the store position to releasably lock the swinging member in said store position, and means for mounting the housing to the vehicle such that the tow ball is positioned for towing with the swinging member in the tow position.

2. The trailer hitch of claim 1 wherein the releasable locking means includes a handle means, and means for spring biasing the handle means to locking engagement with the swinging member in either of its two positions.

3. The trailer hitch of claim 2 wherein the handle means includes a shaft extending through apertures in opposite ends of the housing, the shaft having a free end, and a stud member on the handle extending parallel to the shaft, and wherein one of the plates has an aperture through which the shaft extends to lock the swinging member in one position, and the other of the plates has an aperture through which the stud member extends to lock the swinging member in the other position.

4. The trailer hitch of claim 1 wherein the swinging member is mounted to swing in a vertical arc.

5. The trailer hitch of claim 1 wherein the pivoting means include arm members mounted to each side of the housing about halfway between its ends, each arm member having a portion extending below the lower edge of the housing and having a hole therein adjacent the lower edge of the housing, the holes in the arm members being in axial alignment, the swinging member having a pin at its pivotal end which extends into the holes of the arm members for rotating engagement therewith.

6. The trailer hitch of claim 3 wherein the spring biasing means include a retaining means mounted to the shaft of the handle means between its ends, and a spring between the retaining means and one end of the housing.

7. The trailer hitch of claim 3 including a guide member mounted to the housing near the free end of the shaft, the shaft extending through the guide means.

8. The retractable trailer hitch of claim 1 including a rubber pad between the swinging member and the housing with the hitch in the store position.

9. The trailer hitch of claim 1 wherein the plates are parallel to the pivotal axis of the swinging member.

10. A retractable trailer hitch for a vehicle comprising a housing, a swinging member having one end pivotally mounted to the housing for swinging movement between tow and store positions, its other end having means for supporting a tow ball in an upright position with the swinging member in the tow position, a releasable locking means mounted to the housing, plate means mounted to the swinging member a finite distance from the pivot, means associated with the releasable locking means for engaging the plate means when the swinging member is in the tow position to releasably lock the swinging member in said tow position, means associated with the releasable locking means for engaging the plate means when the swinging member is in the store position to releasably lock the swinging member in said store position, and means for mounting the housing to the vehicle such that the tow ball is positioned for towing with the swinging member in the tow position.

11. A retractable trailer hitch for a vehicle comprising a housing, a swinging member having one end pivotally mounted to the housing for swinging movement between tow and store positions, its other end having means for supporting a tow ball in an upright position with the swinging member in the tow position, a releasable locking means mounted to the housing, the releasable locking means including a shaft extending through at least one end of the housing, the shaft having a free end, and a stud member associated with the releasable locking means extending parallel to the shaft, means associated with the swinging member for engaging the shaft to releasably lock the swinging member in one position, means associated with the swinging member for engaging the stud member to releasably lock the swinging member in the other position, and means for mounting the housing to the vehicle such that the tow ball is positioned for towing with the swinging member in the tow position.

12. The trailer hitch of claim 11 wherein the releasable locking means includes means for spring biasing the releasable locking means to locking engagement with the swinging member in either of its two positions.

13. The trailer hitch of claim 12 wherein the spring baising means include a retaining means mounted to the shaft of the releasable locking means, and a spring between the retaining means and one end of the housing.

14. The trailer hitch of claim 11 including a guide means mounted to the housing near the free end of the shaft, the shaft extending through the guide means.

15. The trailer hitch of claim 11 further comprising first and second plates mounted to and extending in opposite directions from the swinging member, means associated with one of the plates for engaging the shaft to releasably lock the swinging member in one position, and means associated with the other plate for engaging the stud member to releasably lock the swinging member in the other position.

16. The trailer hitch of claim 15 wherein the plates are mounted to the swinging member a distance from its pivot such that the first plate is releasably locked at one end of the housing with the swinging member in the tow position, and the second plate is releasably locked at the other end of the housing with the swinging member in the store position.

17. The trailer hitch of claim 15 wherein the plates are parallel to the pivotal axis of the swinging member.

* * * * *